US012810178B2

(12) United States Patent
Tater et al.

(10) Patent No.: US 12,810,178 B2
(45) Date of Patent: Nov. 24, 2026

(54) AUTOMATED CODE-MIXED NATURAL LANGUAGE PROCESSING FOR ARTIFICIAL INTELLIGENCE-BASED QUESTION ANSWERING TECHNIQUES

(71) Applicant: International Business Machines Corporation, Armonk, NY (US)

(72) Inventors: Tarun Tater, Bangalore (IN); Jaydeep Sen, Bangalore (IN); Rudra Murthy Venkataramana, Bangalore (IN); Vishwajeet Kumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1254 days.

(21) Appl. No.: 17/678,276

(22) Filed: Feb. 23, 2022

(65) Prior Publication Data

US 2023/0267343 A1 Aug. 24, 2023

(51) Int. Cl.
*G06N 5/04* (2023.01)

(52) U.S. Cl.
CPC .................................... *G06N 5/04* (2013.01)

(58) Field of Classification Search
CPC .. G06N 5/04; G06N 5/02; G06N 5/00; G06N 3/08; G06N 3/02; G06F 16/3329; G06F 16/3338; G06F 16/3334; G06F 16/3332; G06F 40/216; G06F 40/205; G06F 40/20; G06F 40/30; G06F 40/00; G06F 40/58; G06F 40/40; G06F 40/263
USPC .............................................. 706/55, 46, 45
See application file for complete search history.

(56) References Cited

U.S. PATENT DOCUMENTS

| | | | | |
|---|---|---|---|---|
| 9,779,085 | B2 | 10/2017 | Wick et al. | |
| 10,977,452 | B2 | 4/2021 | Wang et al. | |
| 2007/0043574 | A1* | 2/2007 | Coffman ................ | H04M 3/50 704/E15.04 |

(Continued)

OTHER PUBLICATIONS

Kao et al., "Providing quality responses with natural language interfaces: the null value problem", IEEE Transactions on Software Engineering. vol. 14, No. 7. Jul. 1988, pp. 959-984. (Year: 1988).*

(Continued)

*Primary Examiner* — Hwei-Min Lu
(74) *Attorney, Agent, or Firm* — Ryan, Mason & Lewis, LLP

(57) ABSTRACT

Methods, systems, and computer program products for automated code-mixed natural language processing for artificial intelligence-based question answering techniques are provided herein. A computer-implemented method includes detecting multiple languages in an input query to an artificial intelligence-based question answering system; determining, in the input query, one or more partial query signals associated with each of the multiple languages; identifying one or more missing entity arguments from at least a portion of the one or more partial query signals; updating at least a portion of the one or more missing entity arguments by inferring data from at least a portion of the one or more partial query signals using at least one artificial intelligence technique; and performing one or more automated actions based at least in part on the updating of at least a portion of the one or more missing entity arguments.

20 Claims, 5 Drawing Sheets

(56) References Cited

U.S. PATENT DOCUMENTS

| | | | | |
|---|---|---|---|---|
| 2011/0320187 | A1* | 12/2011 | Motik | G06F 16/3329 704/9 |
| 2016/0217124 | A1* | 7/2016 | Sarikaya | G06F 40/279 |
| 2017/0357632 | A1* | 12/2017 | Pagallo | G06F 3/04886 |
| 2018/0107647 | A1* | 4/2018 | Ackermann | G06F 40/289 |
| 2019/0179940 | A1* | 6/2019 | Ross | G06F 16/24535 |
| 2019/0294925 | A1* | 9/2019 | Kang | G06F 16/3329 |
| 2019/0317994 | A1* | 10/2019 | Singh | G06F 40/30 |
| 2020/0033954 | A1* | 1/2020 | Asumu | G06F 16/3326 |
| 2020/0117857 | A1* | 4/2020 | Gnanasambandam | G16H 15/00 |
| 2021/0382923 | A1* | 12/2021 | Gragnani | G06F 16/3329 |
| 2022/0051665 | A1* | 2/2022 | Bade | G06N 7/01 |
| 2022/0067766 | A1* | 3/2022 | Bostick | G06Q 30/0207 |

OTHER PUBLICATIONS

Li et al., "Joint Argument Inference in Chinese Event Extraction with Argument Consistency and Event Relevance", IEEE/ACM Transactions on Audio, Speech, and Language Processing, vol. 24, No. 4, Apr. 2016, pp. 612-622. (Year: 2016 ).*

Hakimov et al., "AMUSE: Multilingual Semantic Parsing for Question Answering over Linked Data", Arxiv Id: 1802.09296, Feb. 26, 2018, pp. 1-16. (Year: 2018).*

Thara et al., "Code Mixed Question Answering Challenge using Deep Learning Methods", Proceedings of the Fifth International Conference on Communication and Electronics Systems (ICCES 2020), Jun. 10-12, 2020, pp. 1331-1337. (Year: 2020).*

Giorgi et al., "Modeling Multiple Language Learning in a Developmental Cognitive Architecture", IEEE Transactions on Cognitive and Developmental Systems, vol. 13, No. 4, Dec. 2021, pp. 922-933. (Year: 2021).*

Raghavi et al., "Answer Ka Type Kya He?" Learning to Classify Questions in Code-Mixed Language, WWW '15 Companion: Proceedings of the 24th International Conference on World Wide Web, pp. 853-858, May 2015.

Aguilar et al., LinCE: A Centralized Benchmark for Linguistic Code-Switching Evaluation, arXiv:2005.04322; May 9, 2020.

Chandu et al., Code-Mixed Question Answering Challenge: Crowd-Sourcing Data and Techniques, Proceedings of the Third Workshop on Computational Approaches to Code-Switching, pp. 29-38; Jul. 19, 2018.

Khanuja et al., GLUECoS: An evaluation benchmark for code-switched NLP, May 14, 2020.

Gupta et al., Training Data Augmentation for Code-Mixed Translation, Proceedings of the 2021 Conference of the North American Chapter of the Association for Computational Linguistics: Human Language Technologies, Jun. 6, 2021.

Dowlagar et al., Gated Convolutional Sequence to Sequence Based Learning for English-Hingilsh Code-Switched Machine Translation, Proceedings of the Fifth Workshop on Computational Approaches to Linguistic Code-Switching, Jun. 11, 2021.

Jawahar et al., Exploring Text-to-Text Transformers for English to Hinglish Machine Translation with Synthetic Code-Mixing, May 18, 2021.

Gautam et al., CoMeT: Towards Code-Mixed Translation Using Parallel Monolingual Sentences, Proceedings of the Fifth Workshop on Computational Approaches to Linguistic Code-Switching, Jun. 11, 2021.

Srivastava et al., PHINC: A Parallel Hinglish Social Media Code-Mixed Corpus for Machine Translation, Apr. 20, 2020.

Banerjee et al., "The First Cross-Script Code-Mixed Question Answering Corpus", MultiLingMine@ ECIR. 2016, 10 pages.

Banerjee et al., The First Cross-Script Code-Mixed Question Answering Corpus, Proceedings of the First Workshop on Modeling, Learning and Mining for Cross/Multilinguality, p. 56-65; Mar. 20, 2016.

* cited by examiner

AUTOMATED CODE-MIXED NATURAL LANGUAGE PROCESSING FOR ARTIFICIAL INTELLIGENCE-BASED QUESTION ANSWERING TECHNIQUES

BACKGROUND

The present application generally relates to information technology and, more particularly, to data processing techniques. More specifically, processing and/or interpreting natural language queries having a mix of multiple languages presents challenges for conventional data processing techniques, which typically operate within the context of a single language. Accordingly, such conventional approaches often result in outputs that are confusing and/or inaccurate.

SUMMARY

In at least one embodiment, techniques for automated code-mixed natural language processing for artificial intelligence-based question answering techniques are provided. An example computer-implemented method includes detecting two or more languages in an input query to an artificial intelligence-based question answering system, and determining, in the input query, one or more partial query signals associated with each of the two or more languages. The method also includes identifying one or more missing entity arguments from at least a portion of the one or more partial query signals, and updating at least a portion of the one or more missing entity arguments by inferring data from at least a portion of the one or more partial query signals using at least one artificial intelligence technique. Additionally, the method includes performing one or more automated actions based at least in part on the updating of at least a portion of the one or more missing entity arguments.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
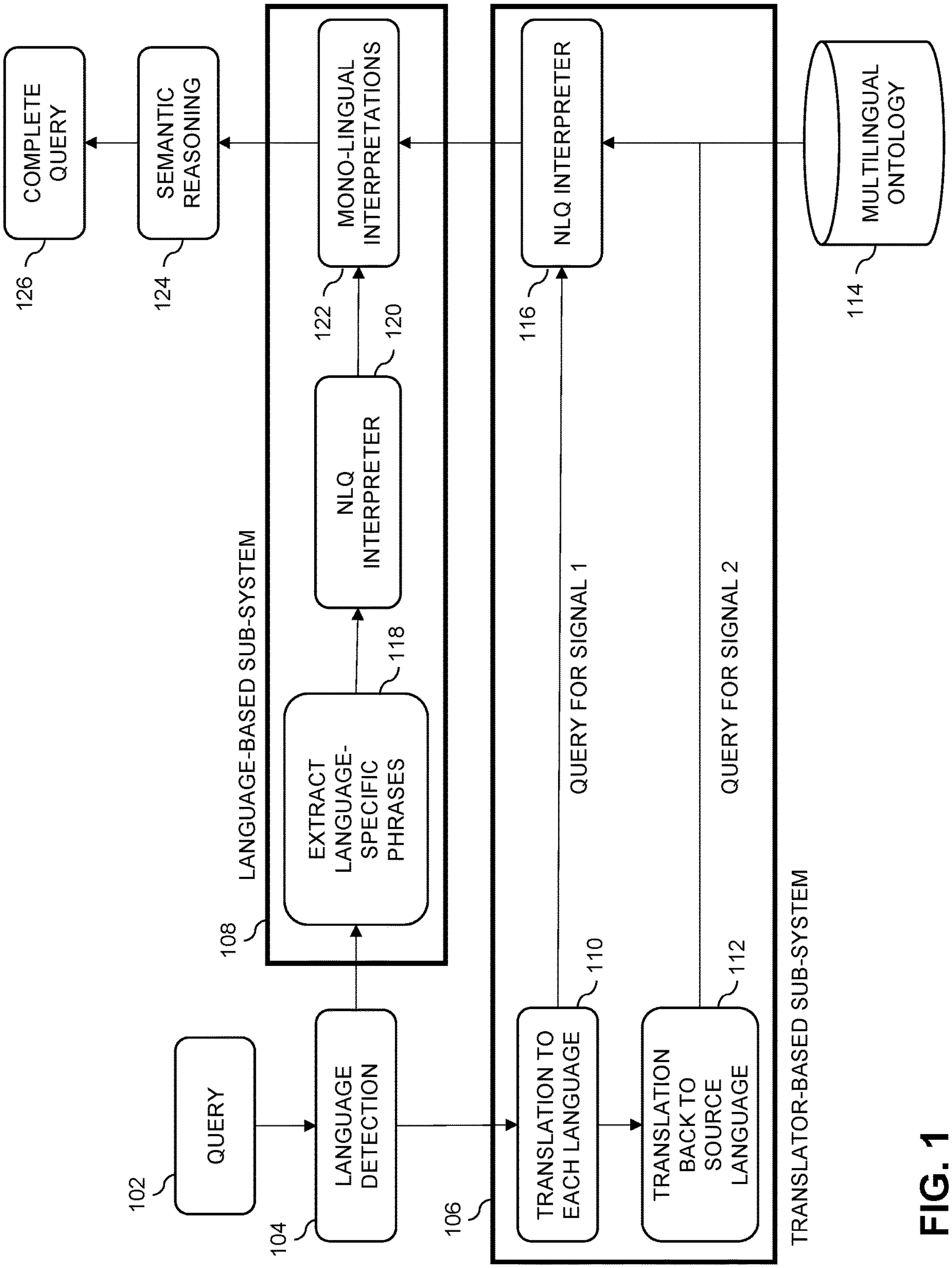
FIG. 1 is a diagram illustrating system architecture, according to an example embodiment of the invention.

As described herein, at least one embodiment includes automated code-mixed natural language processing for artificial intelligence-based question answering techniques. For example, such an embodiment can include interpreting and/or inferring natural language queries spanning multiple languages and/or with one or more code-mixed utterances to generate one or more coherent backend queries. More specifically, at least one example embodiment includes inferring, by processing at least one input query, which word(s) and/or phrase(s) belong to which of two or more languages, and ensuring correct spelling of such word(s) and/or phrase(s) by filtering one or more type of input (TI) entries. As used herein, TI refers to translation index, which represents an inverted index created for data values seen in backend data. Additionally, such an embodiment can include identifying, from the input, one or more possible synonyms for one or more of the word(s) and/or phrase(s). In identifying possible synonyms, one or more embodiments can include using at least one subject matter expert-provided dictionary for one or more vocabularies, and/or can include using DBPedia or Wordnet-type resources. Further, one or more embodiments include determining, in connection with the processed input, one or more entity relations and/or one or more parameters for different concepts such as, for example, aggregation, focus entities, order by, time phrase etc. In at least one embodiment, the entity relations and/or parameters can be learned through provided training data and/or via use of one or more specific heuristics and/or language patterns (e.g., average <entity>, maximum <entity>, etc.) to detect such occurrences.

As detailed herein, one or more embodiments include enabling a natural language interface to a database (NLIDB) system to interpret one or more code-mixed utterances and infer at least one query intent through domain reasoning by processing and/or understanding one or more partial intents from each language phrase and correlating such partial intents semantically to produce at least one complete intent and at least one executable query. In such an embodiment, implementing domain reasoning techniques can include inferring one or more missing components from an input and/or combining partial intents to produce at least one semantically complete intent, thereby creating at least one executable query for use in connection with one or more underlying databases. With respect to domain reasoning techniques, one or more embodiments can include applying a set of universal axioms, which are language-agnostic (such as, for example, any aggregation needs an argument which should be numeric, any value comparison needs a numeric argument, a compare operation, a value, etc.). Such axioms can be used, for instance, to fill-in missing items of information if such items are dispersed across languages. As such, using language-agnostic axioms applied over a target domain, one or more embodiments can include combining evidence across languages to generate a coherent interpretation.

As further detailed herein (e.g., in connection with FIG. 1), one or more embodiments include providing techniques for processing and/or handling code-mixed queries. Such an embodiment includes obtaining an input in the form of partial signals from two or more language parts, and generating an output in the form of at least one complete query. Additionally, such an embodiment, as further described below, includes detecting one or more missing entity arguments from the partial signals input, inferring entity arguments for the missing entity arguments by processing at least a portion of the partial signals input, and implementing query building techniques using one or more complete signals (generated based at least in part on the inferred entity arguments).

In at least one embodiment, detecting missing entity arguments from an input can include the following steps. For example, such an embodiment can include enumerating different categories of missing entity arguments. For example, for missing arguments, every aggregation needs an argument, and detection criteria can include the presence of aggregation keywords without an argument. Additionally or alternatively, in such an example embodiment, any numeric comparison needs a numeric argument and a comparison value, and detection criteria can include the presence of numeric comparisons without an argument and/or numeric value. Further, in one or more embodiments, with respect to missing co-references, any co-reference keyword needs to have an associated referred entity. In such an example embodiment, detection criteria can include the presence of a co-reference without a referred entity.

As noted above, one or more embodiments also include inferring entity arguments for detected missing entity arguments. Such an embodiment can include using reasoning over entity types and/or data types to infer missing entity arguments. By way of example, for a missing aggregation argument, if the missing aggregation argument is a numeric aggregation, at least one embodiment includes borrowing the numeric property from at least one other language (e.g., the second language in a two-language input). If the missing aggregation argument is a numeric comparison, at least one embodiment includes borrowing a numeric aggregation and/or a numeric property from at least one other language (e.g., the second language in a two-language input). Additionally or alternatively, if the missing argument is a co-reference, at least one embodiment includes applying an entity type recognizer to classify the co-reference into one or more broader categories (e.g., a "Person" category, a "Location" category, a "Date" category, etc.) and/or borrowing the entity from another language (e.g., the second language in a two-language input) matching the entity type of the given co-reference word.

Additionally, one or more embodiments include implementing a machine learning-based approach in connection with at least a portion of the techniques detailed above and here. By way of example, such an example can include using a sequence-to-sequence (Seq-to-Seq) learning paradigm to learn one or more associations of code-mixed entity arguments. Such an embodiment can include processing an input in the form of partial signals with missing entity arguments, and generating an output in the form of one or more complete signals with filled-in entity arguments (e.g., in the place of the missing entity arguments from the input).

In one or more embodiments, generating such an output can include using at least one neural network (e.g., at least one pointer network) to point to existing tokens in at least one input query for filling-in the missing entity arguments. Such a neural network can be trained and/or learned, for example, to complete partial signals.

At least one embodiment can also include translating query portions into one or more individual languages. By way of example, in such an embodiment, an input query can be considered to be in each of two or more source languages, and portions of the input query can be translated into (and out of) each such language. Annotations from each language can then be used as one or more weak signals to infer one or more entities for each filter such as, e.g., aggregation, focus, etc. When recognizers output certain signals (e.g., an aggregation signal) but with low probability or other problems (e.g., such as a missing argument), such signals are referred to as weak signals. In one or more embodiments, another weak signal which can be utilized can include the back translation of a translated query.

FIG. 1 is a diagram illustrating system architecture, according to an embodiment of the invention. By way of illustration, FIG. 1 depicts a query 102 processed by a language detection component 104. In one or more embodiments, language detection component 104 detects multiple languages in the query 102. Outputs pertaining to the determination(s) of language detection component 104 are provided to translator-based sub-system 106 and language-based sub-system 108 for further processing, as detailed below.

With respect to translator-based sub-system 106, step 110 includes translating each of one or more portions of query 102 into each detected language, and providing such translation(s) as a query for a first signal (e.g., signal 1) to be processed by natural language query (NLQ) interpreter 116. Additionally, step 112 includes translating each of the one or more portions of query 102 back to the two or more source languages, and providing such translation(s) as a query for a second signal (e.g., signal 2) to be processed by NLQ interpreter 116. In at least one embodiment, the signals captured from a query can depend on the language patterns encoded and learned in the recognizers and the multi-lingual ontology. Accordingly, in such an embodiment, it is possible that a recognizer will miss a signal when the query is phrased in a first language, but the recognizer is able to process the signal in a different language. As such, one or more embodiments include purposefully expanding the same query into different languages to cover multiple signals.

As also depicted in FIG. 1, the NLQ interpreter 116, in conjunction with inputs from multilingual ontology database 114 (which can store data such as, for example, synonyms of same domain entities in different languages), processes the query for the first signal and the query for the second signal and generates one or more outputs (e.g., a set of weak signals such as possible entities with corresponding parameters or missing parameters) which are provided to mono-lingual interpretations component 122 of language-based sub-system 108.

With respect to language-based sub-system 108, step 118 includes extracting, from at least a portion of the output provided by language detection component 104, one or more language-specific phrases. NLQ interpreter 120 processes the one or more language-specific phrases extracted in step 118 and generates one or more outputs (e.g., portions of phrases corresponding to each language) which are provided to mono-lingual interpretations component 122.

At least a portion of mono-lingual interpretations in component 122 is then processed by a semantic reasoning component 124, which generates and/or outputs a complete query 126 for processing by an artificial intelligence-based question answering system.

Figure 2:
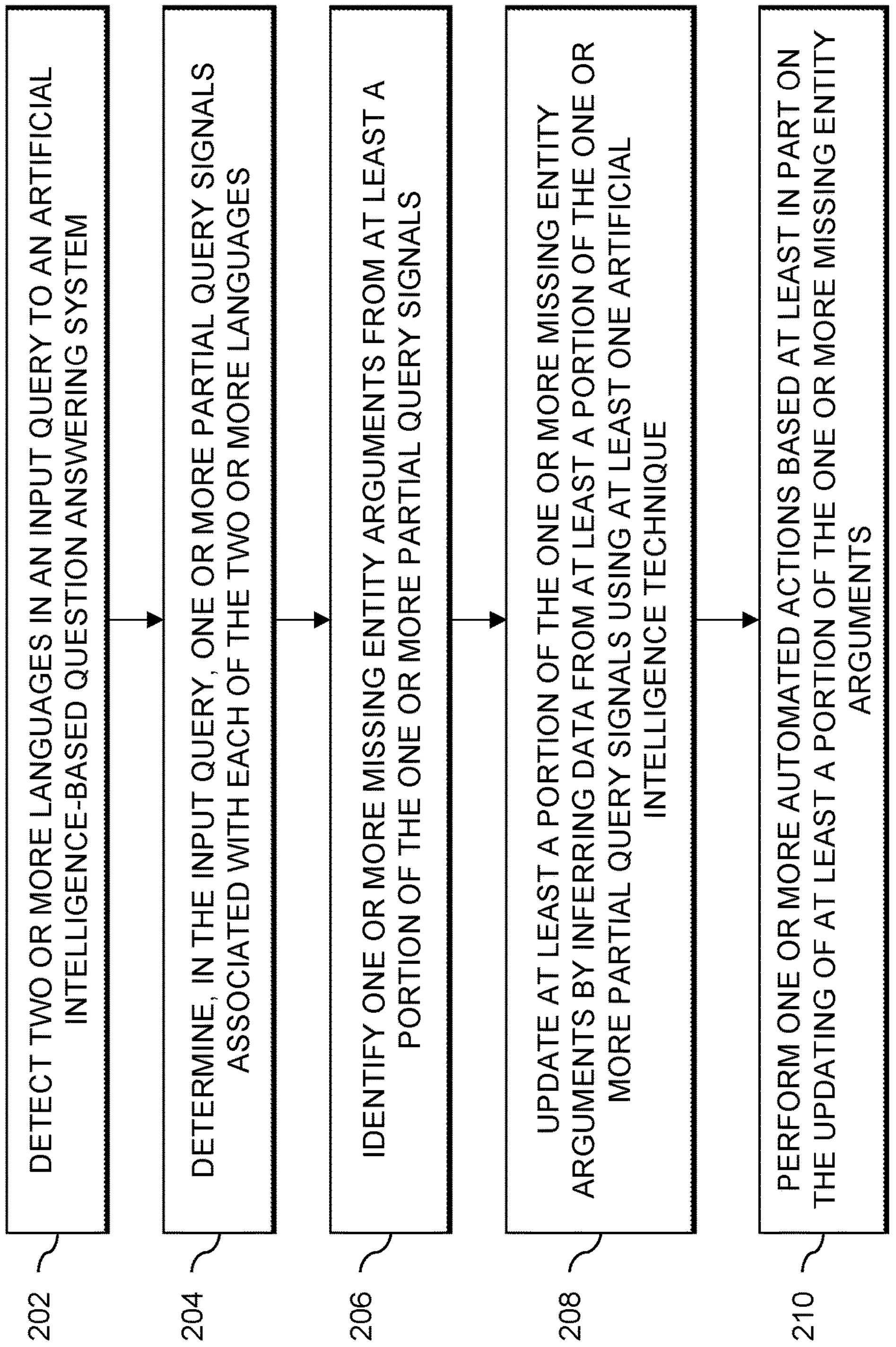
FIG. 2 is a flow diagram illustrating techniques according to an example embodiment of the invention.

FIG. 2 is a flow diagram illustrating techniques according to an embodiment of the present invention. Step 202 includes detecting two or more languages in an input query to an artificial intelligence-based question answering system. Step 204 includes determining, in the input query, one or more partial query signals associated with each of the two or more languages. In at least one embodiment, determining one or more partial query signals associated with each of the two or more languages includes identifying, for each of the two or more languages, one or more language-specific phrases in the input query.

Step 206 includes identifying one or more missing entity arguments from at least a portion of the one or more partial query signals. In one or more embodiments, identifying one or more missing entity arguments includes detecting a presence of one or more aggregation keywords without at least one corresponding argument. Additionally or alternatively, identifying one or more missing entity arguments can include detecting a presence of one or more numeric comparisons without one or more of at least one argument and at least one numeric value and/or detecting a presence of one or more co-references without at least one corresponding referred entity.

Step 208 includes updating at least a portion of the one or more missing entity arguments by inferring data from at least a portion of the one or more partial query signals using at least one artificial intelligence technique. In at least one embodiment, inferring data from at least a portion of the one or more partial query signals using at least one artificial intelligence technique can include inferring data from at least a portion of the one or more partial query signals by processing the at least a portion of the one or more partial query signals using at least one of one or more semantic reasoning techniques and one or more sequence-to-sequence learning techniques. Additionally or alternatively, inferring data from at least a portion of the one or more partial query signals using at least one artificial intelligence technique can include dynamically identifying one or more synonyms for one or more words within the at least a portion of the one or more partial query signals. Further, in one or more embodiments, updating at least a portion of the one or more missing entity arguments can include determining one or more entity relations for one or more concepts including one or more of aggregation, order by, temporal phrase, etc.

Step 210 includes performing one or more automated actions based at least in part on the updating of at least a portion of the one or more missing entity arguments. In at least one embodiment, performing one or more automated actions can include generating an answer to the input query using the artificial intelligence-based question answering system. Additionally or alternatively, performing one or more automated actions can include training the at least one artificial intelligence technique using at least a portion of the input query.

Further, in one or more embodiments, software implementing the techniques depicted in FIG. 2 can be provided as a service in a cloud environment.

It is to be appreciated that "model," as used herein, refers to an electronic digitally stored set of executable instructions and data values, associated with one another, which are capable of receiving and responding to a programmatic or other digital call, invocation, or request for resolution based upon specified input values, to yield one or more output values that can serve as the basis of computer-implemented recommendations, output data displays, machine control, etc. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
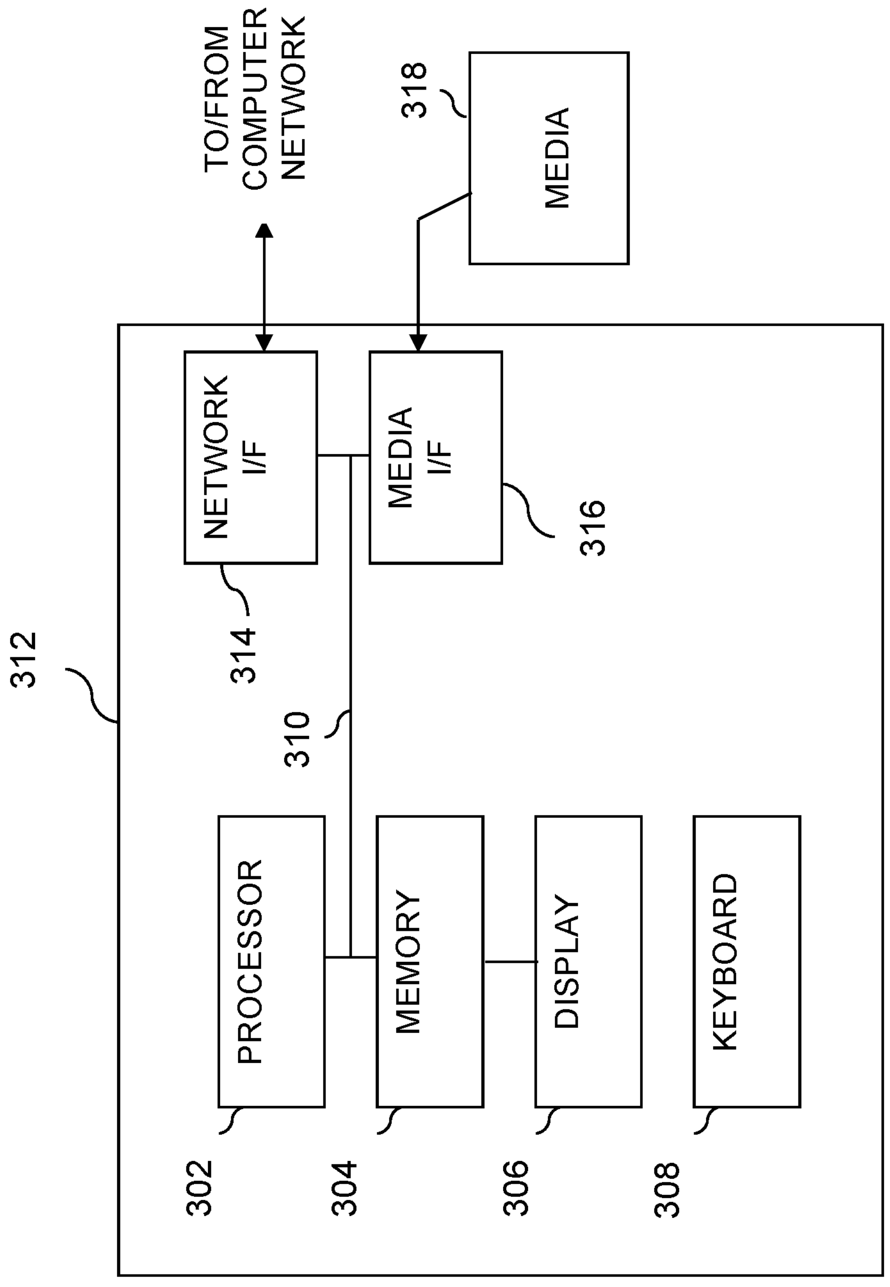
FIG. 3 is a system diagram of an example computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory)

and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
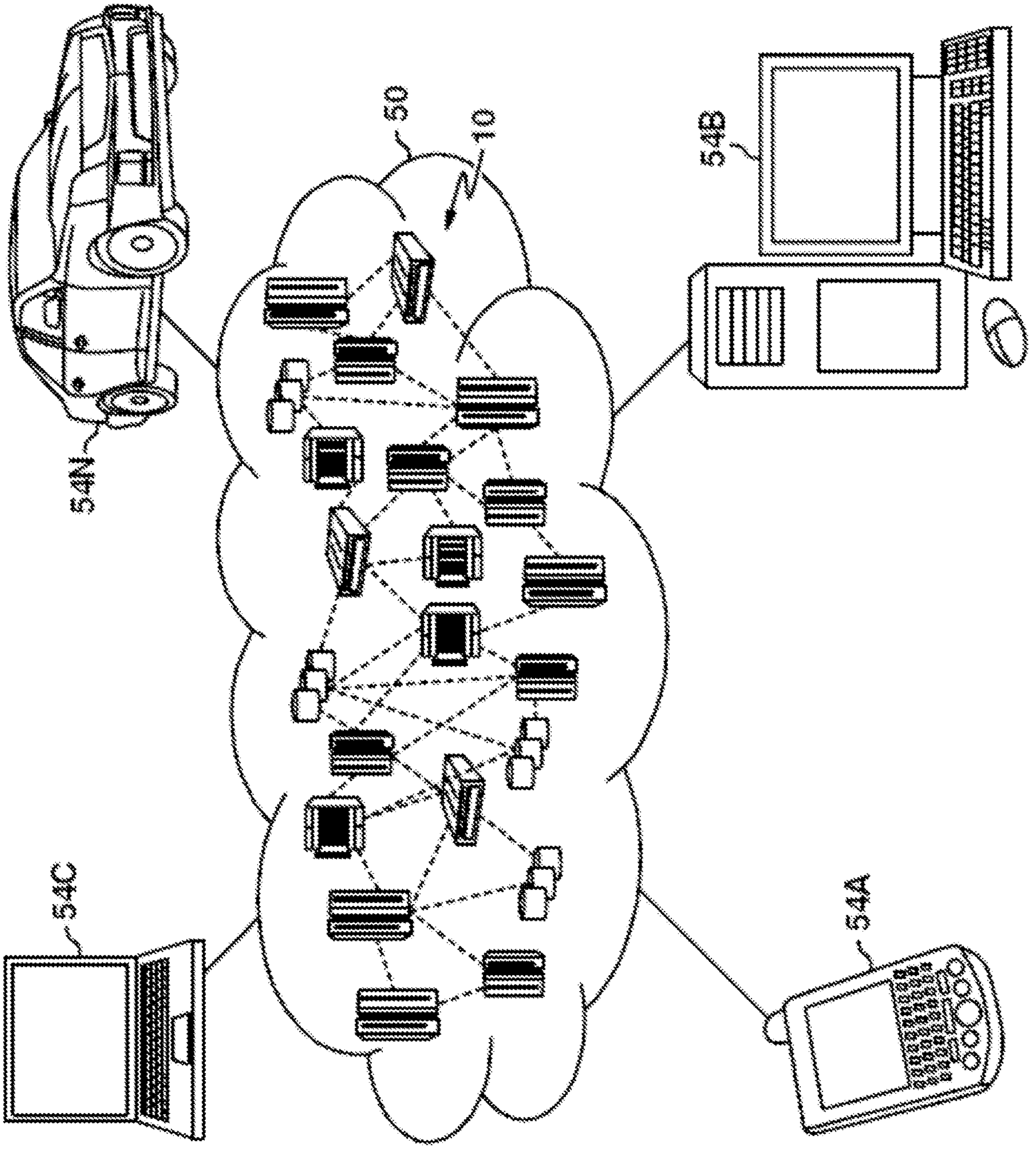
FIG. 4 depicts a cloud computing environment according to an example embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
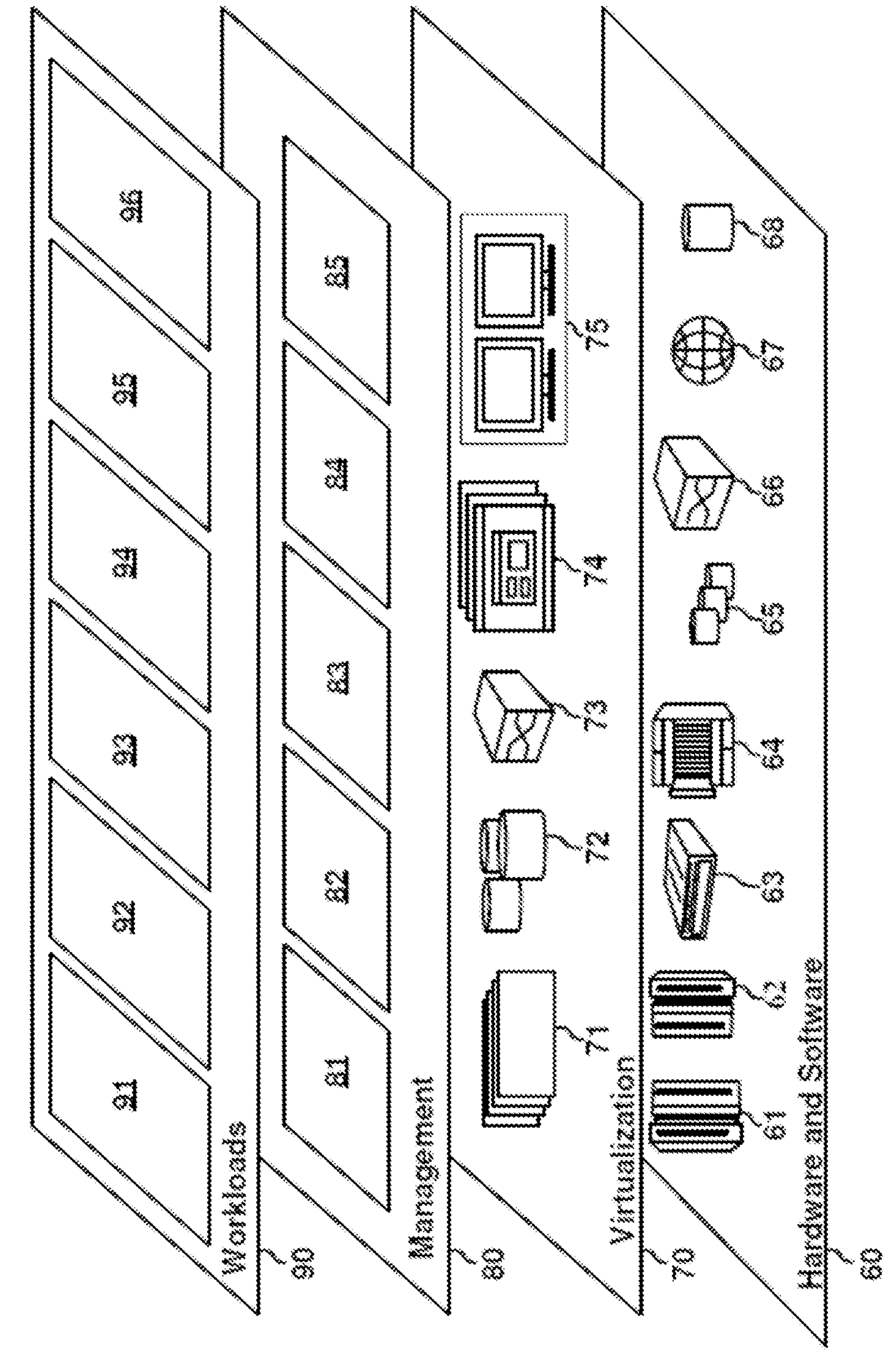
FIG. 5 depicts abstraction model layers according to an example embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated code-mixed natural language interpretation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automated code-mixed natural language interpretations for question answering techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

detecting two or more languages in an input query to an artificial intelligence-based question answering system;

determining, in the input query, one or more partial query signals associated with each of the two or more languages;

identifying one or more missing entity arguments from at least a portion of the one or more partial query signals;

updating at least a portion of the one or more missing entity arguments by inferring data from the at least a portion of the one or more partial query signals using at least one artificial intelligence technique, wherein inferring the data comprises using, for at least one missing entity argument from among the one or more missing entity arguments, wherein the at least one missing entity argument is associated with a first language of the two or more languages, at least one property from at least one other language of the two or more languages, and wherein the at least one property is of a category corresponding to a type of entity argument attributed to the at least one missing entity argument; and performing one or more automated actions based at least in part on the updating of the at least a portion of the one or more missing entity arguments, wherein performing the one or more automated actions comprises generating at least one backend query to be processed by the artificial intelligence-based question answering system by integrating the input query and the at least a portion of the one or more missing entity arguments updated with the inferred data;

wherein the method is carried out by at least one computing device.

2. The computer-implemented method of claim 1, wherein inferring the data from the at least a portion of the one or more partial query signals using the at least one artificial intelligence technique comprises inferring the data from the at least a portion of the one or more partial query signals by processing the at least a portion of the one or more partial query signals using one or more semantic reasoning techniques.

3. The computer-implemented method of claim 1, wherein inferring the data from the at least a portion of the one or more partial query signals using the at least one artificial intelligence technique comprises inferring the data from the at least a portion of the one or more partial query signals by processing the at least a portion of the one or more partial query signals using one or more sequence-to-sequence learning techniques.

4. The computer-implemented method of claim 1, wherein performing the one or more automated actions comprises generating an answer to the input query using the artificial intelligence-based question answering system.

5. The computer-implemented method of claim 1, wherein performing the one or more automated actions comprises training the at least one artificial intelligence technique using at least a portion of the input query.

6. The computer-implemented method of claim 1, wherein inferring the data from the at least a portion of the one or more partial query signals using the at least one artificial intelligence technique comprises dynamically identifying one or more synonyms for one or more words within the at least a portion of the one or more partial query signals.

7. The computer-implemented method of claim 1, wherein updating the at least a portion of the one or more missing entity arguments comprises determining one or more entity relations for one or more concepts comprising one or more of aggregation, order by, and temporal phrase.

8. The computer-implemented method of claim 1, wherein determining the one or more partial query signals associated with said each of the two or more languages comprises identifying, for said each of the two or more languages, one or more language-specific phrases in the input query.

9. The computer-implemented method of claim 1, wherein identifying the one or more missing entity arguments comprises detecting a presence of one or more aggregation keywords without at least one corresponding argument.

10. The computer-implemented method of claim 1, wherein identifying the one or more missing entity arguments comprises detecting a presence of one or more numeric comparisons without one or more of at least one argument and at least one numeric value.

11. The computer-implemented method of claim 1, wherein identifying the one or more missing entity arguments comprises detecting a presence of one or more co-references without at least one corresponding referred entity.

12. The computer-implemented method of claim 1, wherein software implementing the method is provided as a service in a cloud environment.

13. A computer program product comprising a computer readable storage medium having program instructions embodied therewith, the program instructions executable by a computing device to cause the computing device to:

detect two or more languages in an input query to an artificial intelligence-based question answering system;

determine, in the input query, one or more partial query signals associated with each of the two or more languages;

identify one or more missing entity arguments from at least a portion of the one or more partial query signals;

update at least a portion of the one or more missing entity arguments by inferring data from the at least a portion of the one or more partial query signals using at least one artificial intelligence technique, wherein inferring the data comprises using, for at least one missing entity argument from among the one or more missing entity arguments, wherein the at least one missing entity argument is associated with a first language of the two or more languages, at least one property from at least one other language of the two or more languages, and wherein the at least one property is of a category corresponding to a type of entity argument attributed to the at least one missing entity argument; and perform one or more automated actions based at least in part on the updating of the at least a portion of the one or more missing entity arguments, wherein performing the one or more automated actions comprises generating at least one backend query to be processed by the artificial intelligence-based question answering system by integrating the input query and the at least a portion of the one or more missing entity arguments updated with the inferred data.

14. The computer program product of claim 13, wherein inferring the data from the at least a portion of the one or more partial query signals using the at least one artificial intelligence technique comprises inferring the data from the at least a portion of the one or more partial query signals by processing the at least a portion of the one or more partial query signals using one or more semantic reasoning techniques.

15. The computer program product of claim 13, wherein inferring the data from the at least a portion of the one or more partial query signals using the at least one artificial intelligence technique comprises inferring the data from the at least a portion of the one or more partial query signals by processing the at least a portion of the one or more partial query signals using one or more sequence-to-sequence learning techniques.

16. The computer program product of claim 13, wherein performing the one or more automated actions comprises generating an answer to the input query using the artificial intelligence-based question answering system.

17. The computer program product of claim 13, wherein performing the one or more automated actions comprises training the at least one artificial intelligence technique using at least a portion of the input query.

18. The computer program product of claim 13, wherein inferring the data from the at least a portion of the one or more partial query signals using the at least one artificial intelligence technique comprises dynamically identifying one or more synonyms for one or more words within the at least a portion of the one or more partial query signals.

19. The computer program product of claim 13, wherein updating the at least a portion of the one or more missing entity arguments comprises determining one or more entity relations for one or more concepts comprising one or more of aggregation, order by, and temporal phrase.

20. A system comprising:

a memory configured to store program instructions; and a processor operatively coupled to the memory to execute the program instructions to:

detect two or more languages in an input query to an artificial intelligence-based question answering system;

determine, in the input query, one or more partial query signals associated with each of the two or more languages;

identify one or more missing entity arguments from at least a portion of the one or more partial query signals;

update at least a portion of the one or more missing entity arguments by inferring data from the at least a portion of the one or more partial query signals using at least one artificial intelligence technique, wherein inferring the data comprises using, for at least one missing entity argument from among the one or more missing entity arguments, wherein the at least one missing entity argument is associated with a first language of the two or more languages, at least one property from at least one other language of the two or more languages, and wherein the at least one property is of a category corresponding to a type of entity argument attributed to the at least one missing entity argument; and perform one or more automated actions based at least in part on the updating of the at least a portion of the one or more missing entity arguments, wherein performing the one or more automated actions comprises generating at least one backend query to be processed by the artificial intelligence-based question answering system by integrating the input query and the at least a portion of the one or more missing entity arguments updated with the inferred data.

* * * * *